(12) United States Patent  
Köenders

(10) Patent No.: US 6,167,754 B1  
(45) Date of Patent: Jan. 2, 2001

(54) METHOD OF CHECKING LAMBDA SENSOR CONNECTIONS IN MULTICYLINDER INTERNAL COMBUSTION ENGINES

(75) Inventor: Johannes Köenders, Gäufelden (DE)

(73) Assignee: Daimler-Chrysler AG, Stuttgart (DE)

( * ) Notice: Under 35 U.S.C. 154(b), the term of this patent shall be extended for 0 days.

(21) Appl. No.: 09/132,012

(22) Filed: Aug. 10, 1998

(30) Foreign Application Priority Data

Aug. 11, 1997 (DE) .............................. 197 34 670

(51) Int. Cl.[7] .................. G01L 3/26; F01N 3/00; F01K 25/02; F02C 1/04
(52) U.S. Cl. .................. 73/116; 60/276; 60/274; 60/684
(58) Field of Search .................. 73/116, 117.3; 60/276, 274; 123/684

(56) References Cited

U.S. PATENT DOCUMENTS

| | | |
|---|---|---|
| 5,113,651 | 5/1992 | Kotzan et al. |
| 5,357,938 * | 10/1994 | Bedford et al. ............... 123/685 |
| 5,417,109 * | 5/1995 | Scourtes . |
| 5,528,932 * | 6/1996 | Bauer et al. ............... 73/23.31 |
| 5,542,292 * | 8/1996 | Schneider et al. . |

FOREIGN PATENT DOCUMENTS

| | | |
|---|---|---|
| 42 25 361 | 2/1994 | (DE) . |
| 44 23 344 | 1/1996 | (DE) . |
| 44 41 432 | 5/1996 | (DE) . |
| 0 691 465 | 1/1996 | (EP) . |

OTHER PUBLICATIONS

J. Abthoff et al,"Der Neuer Zwölfzylinder–Motor Für Die Neue Mercedes–Benz S–Klasse—Teil 2", MTZ—Motortechnische Zeitschrift 52 (1991) 5.

* cited by examiner

Primary Examiner—Benjamin R. Fuller  
Assistant Examiner—Octavia Davis  
(74) Attorney, Agent, or Firm—Klaus J. Bach

(57) ABSTRACT

In a method of checking for a transposition of lambda sensors of a multicylinder internal combustion engine having at least two separate exhaust pipes connected to different cylinders, a catalytic converter arranged in each exhaust pipe, a lambda sensor arranged in each exhaust pipe upstream of the respective catalytic converter, a lambda sensor control circuit for each lambda sensor, and an air inlet connection associated with at least one exhaust pipe upstream of the respective lambda sensor, air is supplied to one of the exhaust pipes, and the signal provided by the respective Lambda sensor is compared with a stored threshold signal value to determine whether the lambda sensor installed is operative and is connected to the proper lambda sensor control circuit.

5 Claims, 1 Drawing Sheet

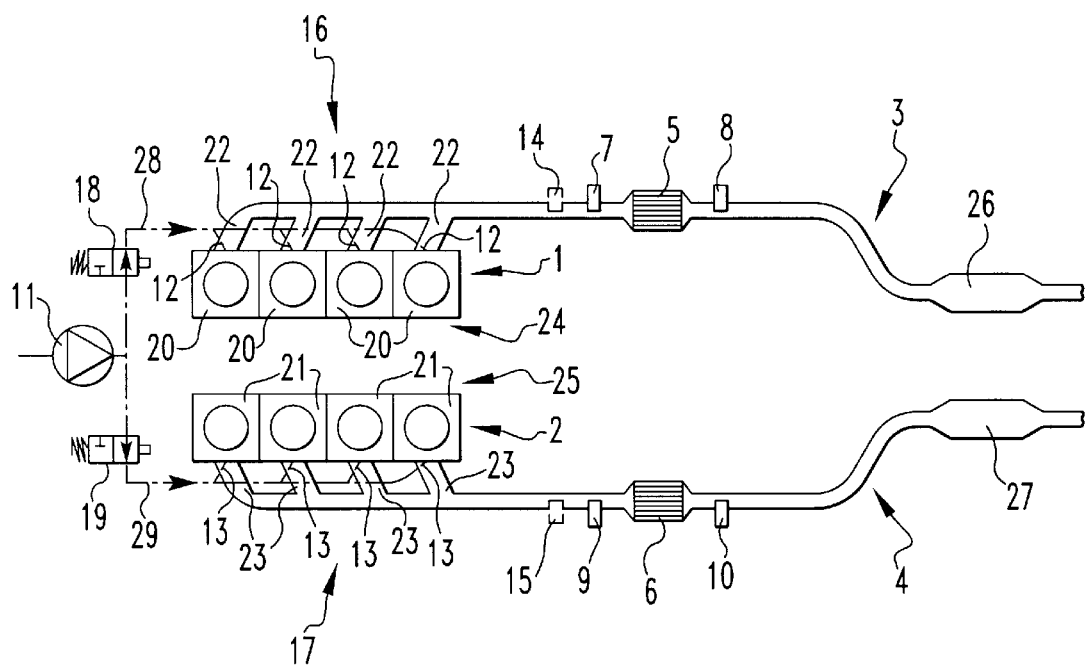

METHOD OF CHECKING LAMBDA SENSOR CONNECTIONS IN MULTICYLINDER INTERNAL COMBUSTION ENGINES

BACKGROUND OF THE INVENTION

The invention resides in a method of checking the lambda sensor connections in multi-cylinder internal combustion engines with at least two separate exhaust gas pipes of which each includes a catalytic converter and at least one lambda sensor arranged in each exhaust gas pipe with a lambda sensor control arrangement connected thereto.

The cylinders of multicylinder internal combustion engines are often arranged in several rows, so-called cylinder banks, comprising each two, four or six cylinders. Generally, however, an engine is limited to two banks which are arranged in the form of a V.

The more cylinders an engine includes, the smaller is the time gap between the ignition of the cylinders and the smoother is the engine torque curve. In order to prevent the exhaust gas discharge of the various cylinders from disturbing one another, several exhaust gas ducts are provided and connected to cylinders whose ignition timings are sufficiently spaced with respect to one another. In multi-row piston type internal combustion engines a separate exhaust gas duct is generally provided for each cylinder bank.

If the exhaust gas values of the internal combustion engine are to be monitored by a lambda sensor control arrangement, that is, the fuel/air mixture ratio is controlled depending on engine operating conditions and exhaust gas sensor values, it has to be taken into consideration that each cylinder bank is subject to individual disturbance factors such as air leakage and different flow rates of the fuel supply equipment. A separate lambda sensor circuit is therefore provided for each cylinder bank. A lambda sensor circuit generally includes a Lambda sensor arranged in the exhaust pipe and a control unit connected thereto.

There is however the possibility that the lambda sensors are transposed when they are installed that is they are connected to the incorrect lambda sensor circuit. For example, with an engine which has two cylinder banks and two lambda sensor control circuits one sensor of the first exhaust pipe may be connected to the second lambda sensor control circuit and, vice versa, the lambda sensor of the second exhaust pipe may be connected to the first lambda sensor control circuit. In such a case, the second lambda sensor for example will properly recognize an enriching of the fuel/air ratio of the first cylinder bank, but the sensor value is supplied to the second lambda sensor control circuit, that is, the lambda sensor control circuit for the second cylinder bank. The second control circuit will then adjust the mixture for the second cylinder bank toward a leaner mixture, which is sensed by the first Lambda sensor which supplies this value to the first Lambda sensor control circuit of the first cylinder bank. This leads to an increasingly lean adjustment for the second cylinder bank and to an increasingly rich adjustment for the first cylinder bank up to the adjustment limits for the lambda control circuits. As a result, the internal combustion engine will operate roughly and the driving comfort will suffer.

Basically, it would be possible to use components or connections for the sensor cable of the different lambda sensors which cannot be interchanged. However, this would require the manufacture and storage of a larger number of parts so that, preferably, the lambda sensors and connections are identical.

DE 44 23 344 A1 discloses a method of testing for a transposition of the Lambda sensors. In this method, the fuel injection valves of one of the two cylinder banks are kept closed for a period permitting the lambda sensors to react or, respectively, switch over. At the end of the shut-off period of the injection valves, the Lambda sensor signal is compared with a predetermined threshold value. If the lambda sensor signal is not in agreement with the threshold value the lambda sensors are connected in a transposed manner. However, this test procedure can be utilized only for an engine wherein the fuel injection valves of at least one cylinder bank can be shut off.

The publication MTZ, Motortechnische Zeitschrift 52, page 221 discloses a piston type internal combustion engine with twelve cylinders having two cylinder banks in a V-arrangement. Each cylinder bank is independent as far as intake and exhaust systems are concerned. Each cylinder bank has a catalytic converter with a lambda sensor arranged upstream of the catalytic converter. An electronic fuel injection control unit controls a secondary air pump for injecting air into the exhaust passages during engine warm up. In combination with the hot exhaust gases, this provides for a supplemental oxidation in the exhaust system which, on one hand, reduces the amount of emissions and, on the other hand, increases the exhaust gas temperature by the exothermic reaction. The air injection can be interrupted concurrently for both cylinder banks by a shut-off valve.

DE 42 25 361 A1 discloses a method for testing proper operation of the secondary air admission to the exhaust system of an internal combustion engine. The internal combustion engine includes only one cylinder bank with one exhaust system and one lambda sensor. After start up of the internal combustion engine, the secondary air pump and a control unit are activated and the signal of the lambda sensor is employed for examining the operation of the secondary air supply.

It is the object of the present invention to provide a method with which transposed connections of lambda sensors can be detected rapidly and in a simple manner and an internal combustion engine which permits the execution of this method.

SUMMARY OF THE INVENTION

In a method of checking for a transposition of the lambda sensors of a multicylinder internal combustion engine having at least two separate exhaust pipes connected to different cylinders, a catalytic converter arranged in each exhaust pipe, a lambda sensor arranged in each exhaust pipe upstream of the respective catalytic converter, a lambda sensor control circuit for each lambda sensor, and an air inlet connection associated with at least one exhaust pipe upstream of the respective lambda sensor, air is supplied to one of the exhaust pipes, and the signal provided by the respective lambda sensor is compared with a stored threshold signal value to determine whether the lambda sensor installed is operative and is connected to the proper lambda sensor control circuit.

During the examination period which is at least as long as the reaction time or, respectively, the switch-over time of the lambda sensor, air is supplied from an air source at least to one exhaust pipe upstream of the lambda sensor by way of at least one air supply connection preferably between the discharge side of the internal combustion engine and the lambda sensor. Independent of the actual air/fuel mixture supplied to the engine and of the fuel injection values the exhaust gas composition can in this way be rapidly changed over a wide range without any risk that a catalytic converter in the exhaust system is damaged or destroyed. The travel distance between the air supply connection and the lambda sensor is short so that the air-enriched exhaust gas reaches the lambda sensor immediately without affecting any engine equipment. The change in the exhaust gas composition can be rapidly recognized by the lambda sensor and the sensor signal can be processed as a clear and safe signal for indicating a transposition of the lambda sensors.

The invention and its advantages will become more readily apparent from the following description of preferred embodiments thereof on the basis of the accompanying drawing.

BRIEF DESCRIPTION OF THE DRAWING

The sole FIGURE shows schematically parts of an internal combustion engine with two cylinder banks and two separate exhaust systems.

DESCRIPTION OF THE PREFERRED EMBODIMENTS

The FIGURE shows an engine with two cylinder banks 1, 2 each of which includes four cylinders 20, 21. Fewer or more cylinders 20, 21 may be included in each bank 1, 2, for example three or six cylinders. At the intake sides 24, 25, which are not shown in detail, an air/fuel mixture is supplied to the cylinders 20, 21 of the internal combustion engine.

After ignition of the air/fuel mixture, the resulting exhaust gas is discharged at the exhaust sides 16, 17 of the engine from the respective cylinders 20, 21 by way of the exhaust manifolds 22, 23. The exhaust manifold connections 22, 23 of each cylinder bank 1, 2 lead to common exhaust pipes 3, 4. Each exhaust pipe 3, 4 includes a catalytic converter 5, 6 upstream and downstream of which Lambda sensors 7, 8, 9, 10 are arranged. The lambda sensors 7, 9 upstream of the catalytic converters 5, 6 are used for the engine control whereas the lambda sensors 8, 10 downstream of the catalytic converters 5, 6 are used for monitoring the operation of the catalytic converters 5, 6 and of the lambda sensors 7, 9. However, it is possible to provide only a single lambda sensor 7, 9 for an exhaust pipe 3, 4. Downstream of the lambda sensors 8, 10 after the catalytic converters 5, 6, the exhaust system each includes a muffler 26, 27.

To check whether the lambda sensors 7, 8, 9, 10 are transposed or incorrectly connected, in accordance with the invention, air is supplied from an air source 11 to one of the exhaust pipes 3, 4 by way of air inlets 12, 13 arranged upstream of the lambda sensors 7, 8, 9, 10. In the embodiment shown, an air pump is employed as the air source 11 which is normally mainly used to supply air to the exhaust sides 16, 17 of the cylinder banks 1, 2 in order to promote combustion of any contaminants in the exhaust gas so as to achieve low emission values. Such air pumps are often standard equipment in US automobiles.

When a check is to be performed whether the lambda sensors are transposed, one of the two air supply lines 28, 29 from the air source 11 to the cylinders 20, 21 is interrupted by closing one of the valves 18, 19 arranged in the air supply lines 28, 29, respectively. As a result, there is less oxygen in the exhaust gas of the exhaust pipe for which the air supply has been interrupted so that the respective lambda sensor is exposed to a richer exhaust gas value while the lambda sensor of the other exhaust pipe is exposed to a relatively lean exhaust gas value. After a certain reaction period or, respectively, an adjustment period of the lambda sensor 7, 8, 9, 10 the lambda sensor signals are compared with a predetermined threshold value. If the lambda sensor signals are not in accordance with the predetermined threshold values, that is, the lambda sensors do not show the appropriate exhaust gas values but show reversed values the lambda sensors 7, 8, 9, 10 are incorrectly connected.

Actually one valve 18, 19 is sufficient to generate different exhaust gas values in the exhaust pipes 3, 4. But it can be advantageous if a leaner or richer exhaust gas value can be generated in either exhaust pipe in order to be able to not only check for transposition of the lambda sensors, but also to monitor the operation of the lambda sensors 7, 8, 9, 10 in the rich and in the lean range without needing to change the air/fuel mixture.

Since with this method, an air source 11 of the internal combustion engine which is anyway present in the engine is used for supplying the air for a transposition examination to the exhaust pipes 3, 4, only few additional building components are required and it is possible with only a few more components to check for a proper connection of the Lambda sensors 7, 8, 9, 10. The examination period may easily be adjusted to the reaction period or respectively, the adjustment period of the lambda sensors 8, 10 downstream of the catalytic converter 5, 6, which however react generally in a somewhat delayed manner as the lambda sensors 8 and 10 react somewhat later than the upstream lambda sensors 7, 9, because of the intermediate catalytic converter.

Instead of the air source 11 for improving the exhaust gas values, other available air sources may be utilized for generating different exhaust gas values in the different exhaust pipes 3,4 by supplying air only to one of the exhaust pipes. Air could be derived, for example, from a turbocharger or from another air mover.

Depending on the design of the internal combustion engine, it may be advantageous to supply the air for the testing of a transposition of the lambda sensors already at the inlet side 24, 25 of the internal combustion engine.

Basically, however it is best to admix the air as close as possible to the lambda sensors 7, 8, 9, 10 that is at least at the discharge side 16, 17 of the internal combustion engine. In this way, the exhaust gas value ahead of the lambda sensors 7, 8, 9, 10 can be varied over a wide range with the smallest expenses and very rapidly since the values can be sensed by the lambda sensors without time delay.

It is of course possible that, instead of the air source 11 as shown in the FIGURE, an external air source (not shown) can be connected to at least one of the exhaust pipes 3, 4 upstream of the lambda sensors 7, 8, 9, 10 by air connectors 14, 15 provided on the exhaust pipes 3, 4. In the embodiment shown, each exhaust pipe 3, 4 is provided with an air connector 14, 15 just upstream of the front most lambda sensors 7, 9, whereby the sensors can be tested for improper connections and for proper operation at the same time. The closer the air connection 14, 15 is to the lambda sensors 7, 8, 9, 10, the faster can the change of the respective exhaust gas value and a transposition of the lambda sensors be recognized. In order to check the downstream lambda sensors 8 and 10, it may be advantageous to provide additional air connectors downstream of the catalytic converters 5, 6.

After the lambda sensors 7, 8, 9, 10 are installed, or after repair work, an external air source can be connected to one of the air connections 14, 15 in order to perform a test for proper sensor connections.

It is also possible to utilize for such a test a gas other than air, which is then supplied to the exhaust pipe 3 or 4, for example if a test for proper lambda sensor installation is to be performed without starting the engine.

What is claimed is:

1. A method of checking for transpositions of lambda sensors of a multicylinder internal combustion engine having at least two separate exhaust pipes connected to different cylinders, a catalytic converter arranged in each exhaust pipe, and a lambda sensor arranged in each exhaust pipe upstream of the respective catalytic converter, each lambda sensor being connected to a lambda sensor control circuit, said method comprising the steps of:

supplying additional air to one of said exhaust pipes upstream of the lambda sensor arranged in said one exhaust pipe for an examination period which is at least as long as a reaction or adjustment time required for a lambda sensor, whereby said lambda sensor generates a particular signal, and comparing the signal generated by said lambda sensor with a threshold value to determine whether the lambda sensor installed in said one exhaust pipe is operative and is connected to the lambda sensor control circuit of the lambda sensor disposed in said one exhaust pipe.

2. An internal combustion engine having at least two sets of cylinders connected to separate exhaust pipes, a catalytic converter arranged in each exhaust pipe, a lambda sensor arranged in each exhaust pipe upstream of said catalytic converter, each lambda sensor being connected to a predetermined lambda sensor control circuit, and an air inlet connection disposed in each exhaust pipe between said engine and said lambda sensor for supplying additional air to said exhaust pipes for changing thereby a composition of the exhaust gas in said exhaust pipe and for checking the lambda sensors for a reaction to said change in the exhaust gas composition to determine whether the lambda sensors are operative and whether each lambda sensor is connected to a respective predetermined lambda sensor control circuit.

3. An internal combustion engine according to claim 2, wherein said air inlet connection is in communication with an air source which is associated with said internal combustion engine.

4. An internal combustion engine according to claim 3, wherein said air source is an air pump with air communication lines leading to said exhaust pipes for supplying air thereto for combustion with unburned components in said exhaust gas, and wherein one of said air communication lines leading to one exhaust pipe includes a valve for closing the communication line to said one exhaust pipe.

5. An internal combustion engine according to claim 2, wherein at least one exhaust pipe has an air inlet connection arranged immediately upstream of said lambda sensor for connecting an external air source to said one exhaust pipe.

* * * * *